(12) United States Patent
Horneck et al.

(10) Patent No.: US 8,371,640 B2
(45) Date of Patent: Feb. 12, 2013

(54) MOTOR VEHICLE WITH A SLIDING DOOR

(75) Inventors: Michael Horneck, Ruesselsheim (DE); Markus Fischer, Buettelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/674,252

(22) PCT Filed: Aug. 5, 2008

(86) PCT No.: PCT/EP2008/006420
§ 371 (c)(1),
(2), (4) Date: May 4, 2011

(87) PCT Pub. No.: WO2009/024261
PCT Pub. Date: Feb. 26, 2009

(65) Prior Publication Data
US 2011/0210576 A1    Sep. 1, 2011

(30) Foreign Application Priority Data
Aug. 23, 2007  (DE) .................... 10 2007 039 803

(51) Int. Cl.
*B60J 5/06* (2006.01)

(52) U.S. Cl. .............. 296/146.9; 296/187.12; 296/146.6

(58) Field of Classification Search ............... 296/146.1, 296/146.5, 146.6, 146.9, 149, 187.03, 187.09, 296/187.12, 202
See application file for complete search history.

(56) References Cited

U.S. PATENT DOCUMENTS

| 3,169,282 | A | 2/1965 | Godwin |
| 4,580,823 | A | 4/1986 | Yamada et al. |
| 5,606,771 | A | 3/1997 | Young |
| 5,626,384 | A | 5/1997 | Walther |
| 5,791,723 | A * | 8/1998 | Bell et al. ............ 296/155 |
| 6,206,455 | B1 | 3/2001 | Faubert et al. |
| 6,616,214 | B2 * | 9/2003 | Wattebled ............ 296/146.1 |
| 7,520,557 | B2 | 4/2009 | Yoshida et al. |
| 2001/0022456 | A1 * | 9/2001 | Kitagawa ............ 296/188 |
| 2005/0264031 | A1 * | 12/2005 | Mitsui et al. ............ 296/146.9 |

(Continued)

FOREIGN PATENT DOCUMENTS

| DE | 1509994 B1 | 11/1971 |
| DE | 19755740 A1 | 7/1998 |

(Continued)

OTHER PUBLICATIONS

International Searching Authority, International Search Report for European Application No. PCE/EP2008/006420, dated Aug. 5, 2008.

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A motor vehicle with a sliding door has a safeguard with two mounting elements. One of the mounting elements is secured to the sliding door, while the other mounting element is arranged on a column bordering the sliding door. The mounting elements pass by each other given a sliding motion by the sliding door, and end up opposite each other during the motion of the sliding door, transversely to the sliding motion. As a result, the safeguard holds the sliding door against the column during a crash in which forces act perpendicularly on the sliding door.

4 Claims, 2 Drawing Sheets

U.S. PATENT DOCUMENTS

2006/0000145 A1* 1/2006 Yoshida et al. .................. 49/360
2010/0253116 A1 10/2010 Lange

FOREIGN PATENT DOCUMENTS

| | | |
|---|---|---|
| DE | 102009016221 A1 | 10/2010 |
| EP | 0098560 A2 | 1/1984 |
| EP | 0540053 A2 | 5/1993 |
| EP | 1612073 A1 | 1/2006 |
| EP | 1745958 A2 | 1/2007 |
| GB | 2075117 A | 11/1981 |
| GB | 2261011 A | 5/1993 |
| GB | 2321269 A | 7/1998 |

* cited by examiner

MOTOR VEHICLE WITH A SLIDING DOOR

CROSS-REFERENCE TO RELATED APPLICATIONS

This application is a U.S. National-Stage entry under 35 U.S.C. §371 based on International Application No. PCT/EP2008/006420, filed Aug. 5, 2008, which was published under PCT Article 21(2) and which claims priority to German Application No. 102007039803.6, filed Aug. 23, 2007, which are all hereby incorporated in their entirety by reference.

TECHNICAL FIELD

The invention relates to a motor vehicle with a sliding door, with a column bordering the sliding door, and with a safeguard for mounting the sliding door during a crash.

BACKGROUND

Such motor vehicles are known in the art, and exhibit at least one lock, with which the sliding door with the bordering column is connected in the closed state. The safeguard is used to hold the sliding door against the most often very rigid column during a crash. In particular given a shifting cargo or passenger collision, the sliding door is exposed to an outward stress, and high forces are introduced into the lock.

In order to provide support against the especially high forces that arise during a crash, thought has already been given to the idea of connecting the sliding door with the column by means of a second lock. However, this leads to very high manufacturing costs, and also makes closing the sliding door uncomfortable.

At least one object of the invention is to further develop a motor vehicle of the kind mentioned at the outset in such a way that it can be manufactured in an especially cost effective manner, and the sliding door can be comfortably closed. In addition, other objects, desirable features, and characteristics will become apparent from the subsequent summary and detailed description, and the appended claims, taken in conjunction with the accompanying drawings and this background.

SUMMARY

The at least one object problem is achieved according to the invention by virtue of the fact that the safeguard has a mounting element arranged on the sliding door and a mounting element arranged on the column, and that the mounting element are situated opposite each other transversely to the provided sliding motion of the sliding door.

As a result of this configuration, the mounting elements enable a reliable buttressing of the sliding door given a crash of the motor vehicle, during which forces are introduced into the sliding door, in particular in a vertical direction. Thanks to the invention, the mounting elements are able to pass by each other given a sliding motion by the sliding door, and end up opposite each other during the motion of the sliding door, transversely to the sliding motion. Such a motion of the sliding door transverse to the sliding direction usually only takes place in the event of a crash, so that the safeguard has no function during operation of the motor vehicle when opening and closing the sliding door in the sliding direction. The invention eliminates the need for intricate latching and unlatching of a second lock. The fact that the two mounting elements are easy to manufacture in comparison to a second lock makes it possible to fabricate the motor vehicle according to the invention in a particularly cost effective manner.

In an advantageous further development of the invention, the safeguard can be given an especially simple structural design by having at least one of the mounting element exhibit a hook.

In an advantageous further development of the invention, especially high mounting forces can be transferred via the safeguard by giving one of the mounting element a strap.

The safeguard can be given an especially simple structural design by having one of the mounting elements exhibit a pin with a radial expansion arranged at the free end.

In another advantageous further development of the invention, it helps to further increase the mounting forces that can be transferred with the safeguard by securing at least one of the mounting elements to a plate, and screwing the plate with the sliding door or the column.

In another advantageous further development of the invention, the safeguard is able to hold the sliding door in mutually opposing directions by having one of the mounting elements exhibit two opposing hooks. As a result, the sliding door is held by the safeguard given a load from outside the motor vehicle that acts on the sliding door, or if cargo or a passenger in the motor vehicle presses against the sliding door from inside. In particular in conjunction with the mounting element having the strap, this configuration affords an especially high level of protection during a crash.

In another advantageous further development of the invention, any impediment caused by the safeguard to closing the sliding door can be easily avoided by having the mounting element that exhibits the mutually opposing hooks have insertion slants arranged on the hooks for the opposing mounting element.

In another advantageous further development of the invention, the hooks and insertion slants can be generated in a particularly easy manner by having one of the mounting elements exhibit a nose-shaped elevation.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
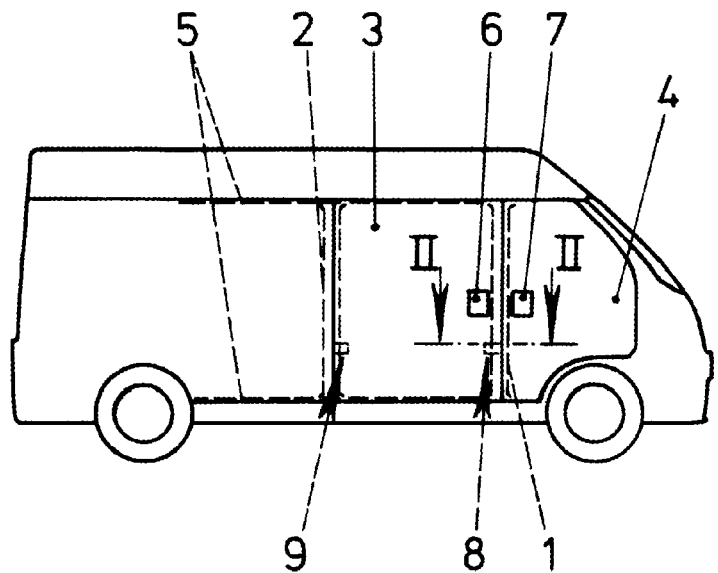
FIG. 1 is a diagrammatic view of a motor vehicle according to an embodiment of the invention.

FIG. 1 shows a motor vehicle with two columns 1, 2 and with a sliding door 3. One of the columns 1 is arranged between the sliding door 3 and another vehicle door 4. The motor vehicle has guides 5 for the sliding door 3. The vehicle door 4 and the sliding door 3 are each latched with the one column 1 by means of a lock 6, 7. One respective safeguard 8, 9 is arranged in the lower third of the sliding door 3 and on the columns 1, 2. The safeguards 8, 9 mount the sliding door 3 on the columns 1, 2 given a load perpendicular to the plane of projection, and hence transverse to the sliding directions prescribed by the guides 5.

Figure 2:
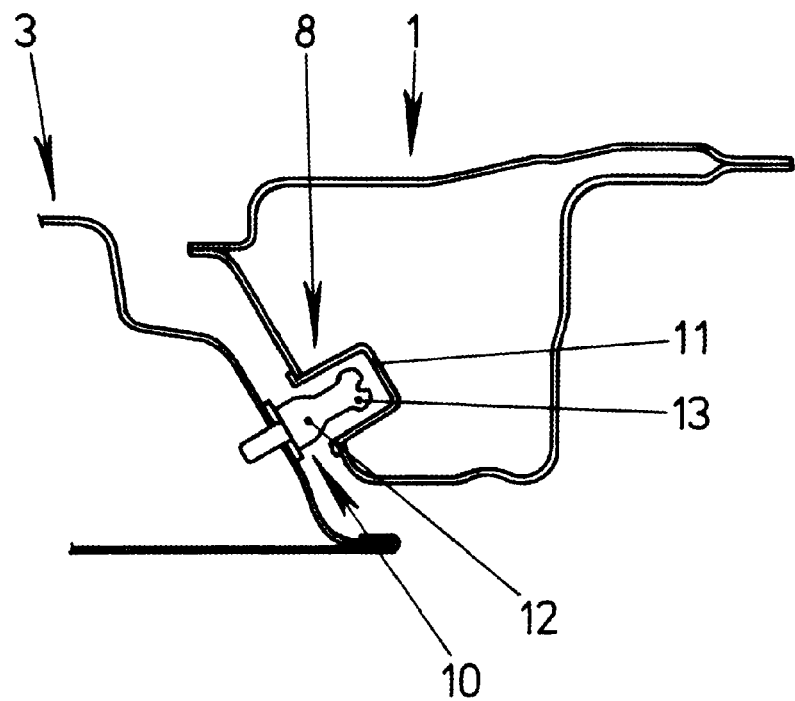
FIG. 2 is a highly magnified sectional view through a safeguard of a sliding door of the motor vehicle from FIG. 1, along line II-II.

FIG. 2 shows a sectional view through one of the columns 1 and the area of the sliding door 3 adjacent thereto with one of the safeguards 8. The safeguard 8 has a mounting element 10 arranged on the sliding door 3, and a mounting element 11 arranged on the column 1. One of the mounting elements 10 has a pin 12 with a radial expansion 13 arranged at the free end. The other mounting element 11 is pot-shaped in design to accommodate the pin 12. Given a sliding motion by the sliding door 3, the mounting element 10 with the pin 12 is inserted into the pot-shaped mounting element 11 or removed from the latter. During a crash, the pin 12 with its radial expansion 13 presses against the wall of the pot-shaped mounting element 11. As a result, the mounting elements 10, 11 generate a positive locking exclusively in the event of a crash.

Figure 3:
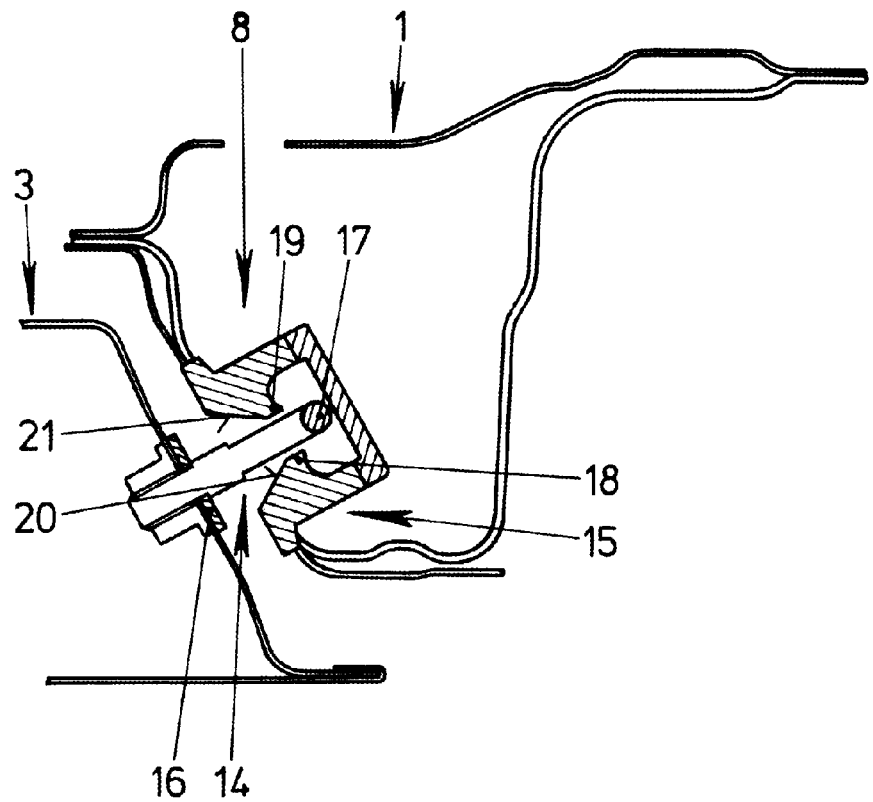
FIG. 3 is a sectional view of another embodiment of the safeguard of the motor vehicle from FIG. 1.
Figure 4:
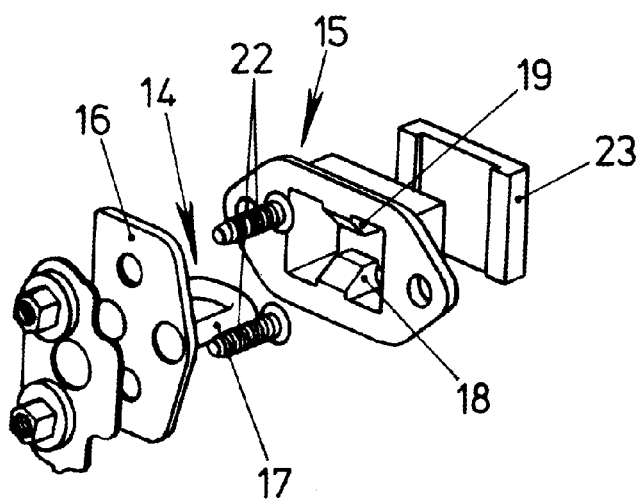
FIG. 4 is an exploded view of the safeguard from FIG. 3.

FIG. 3 shows another embodiment of the safeguard 8 with a mounting element 14 arranged on the sliding door 3 and a mounting element 15 arranged on the column 1. The mounting element 14 arranged on the sliding door 3 has a strap 17 secured to a plate 16. The mounting element 15 arranged on the column 1 has two opposing hooks 18, 19 and insertion inclines 20, 21 for the strap 17 of the other mounting element 14. When the sliding door 3 is opened or closed, the strap 17 of the one mounting element 14 is moved between the hooks 18, 19 of the other mounting element 15. During a crash of the motor vehicle in which the sliding door 3 is moved transversely to the sliding direction, the strap 17 makes its way behind one of the hooks 18, 19. As a result, the sliding door 3 is held against the column 1. For clarification purposes, FIG. 4 shows an exploded view of the safeguard 8 from FIG. 3. The plate 16 holding the strap 17 is secured to the sliding door 3 by means of screws 22. The mounting element 15 with the hooks 18, 19 has a cover 23.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A motor vehicle, comprising:
   a sliding door;
   a column bordering the sliding door; and
   a safeguard, comprising:
      a loop mounted on a plate configured to be secured on the sliding door, and
      a mounting element arranged on the column including two opposing hooks,
   wherein the loop and the mounting element oppose each other transversely and are configured to allow a sliding motion of the sliding door, wherein the loop and the at least one of the two opposing hooks are configured to only lock the sliding door to the column when the sliding door experiences a substantial side impact.

2. The motor vehicle according to claim 1, wherein the mounting element has insertion inclines arranged on the at least two mutually opposing hooks for the loop.

3. The motor vehicle according to claim 1, wherein at least one of the loop and the mounting element has a nose-shaped elevation.

4. The motor vehicle according to claim 1, wherein the mounting element is secured to a plate and the plate is attached to the column.

* * * * *